United States Patent
Chang

[19]

[11] Patent Number: 6,135,014
[45] Date of Patent: Oct. 24, 2000

[54] BARBECUE RACK

[76] Inventor: Yin Shou Chang, P.O. Box 2103, Taichung, Taiwan

[21] Appl. No.: 09/533,216

[22] Filed: Mar. 23, 2000

[51] Int. Cl.[7] .................................. A47J 37/00; F24C 1/16
[52] U.S. Cl. ................................. 99/339; 99/340; 99/426; 99/446; 99/448; 99/449; 99/450; 126/25 R; 126/9 R
[58] Field of Search .............................. 99/339, 340, 400, 99/401, 426, 444–450, 482; 126/25 R, 9 R, 9 B, 29, 30, 40, 43, 44; 211/181.1, 186, 189; 248/150, 153, 165, 168, 156; D7/337, 355, 366

[56] References Cited

U.S. PATENT DOCUMENTS

| | | | |
|---|---|---|---|
| 3,175,549 | 3/1965 | Bergsten | 126/25 R |
| 3,550,525 | 12/1970 | Rabello | 99/446 X |
| 3,611,912 | 10/1971 | Choc | 99/340 X |
| 3,783,855 | 1/1974 | Newinger | 126/25 R |
| 3,999,472 | 12/1976 | Einto | 99/340 |
| 4,120,237 | 10/1978 | Mecherlen | 99/340 |
| 4,338,912 | 7/1982 | Gaskins | 126/25 R |
| 4,442,824 | 4/1984 | Amici | 126/9 R |
| 4,730,597 | 3/1988 | Hottenroth et al. | 126/41 R |
| 5,333,540 | 8/1994 | Mazzocchi | 99/421 V |
| 5,431,093 | 7/1995 | Dodgen | 99/427 X |
| 5,499,574 | 3/1996 | Esposito | 99/339 |
| 5,536,518 | 7/1996 | Rummel | 426/523 |

*Primary Examiner*—Timothy Simone

[57] ABSTRACT

A barbecue rack including a barbecue grill, a base seat, two support legs and a barbecue tray. The frame of each of the barbecue grill and the base seat has a longitudinal section, whereby the barbecue grill, base seat and the barbecue tray can be stacked into one single unit as a thin rectangular body. Therefore, the storage room is saved and the barbecue rack can be easily quickly assembled. The components of the barbecue rack can be firmly associated and the barbecue grill is not easy to detach and drop and the barbecue grill can be entirely used. The height of the barbecue grill can be stagelessly adjusted by means of the support legs of the base seat as necessary.

7 Claims, 5 Drawing Sheets

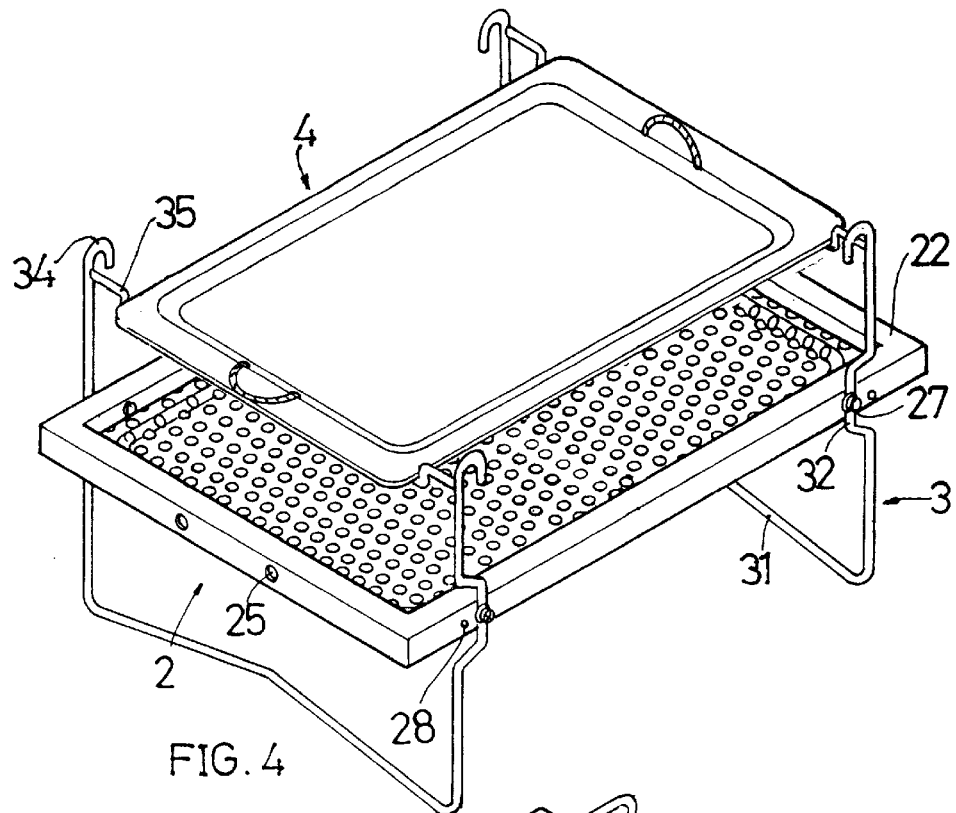
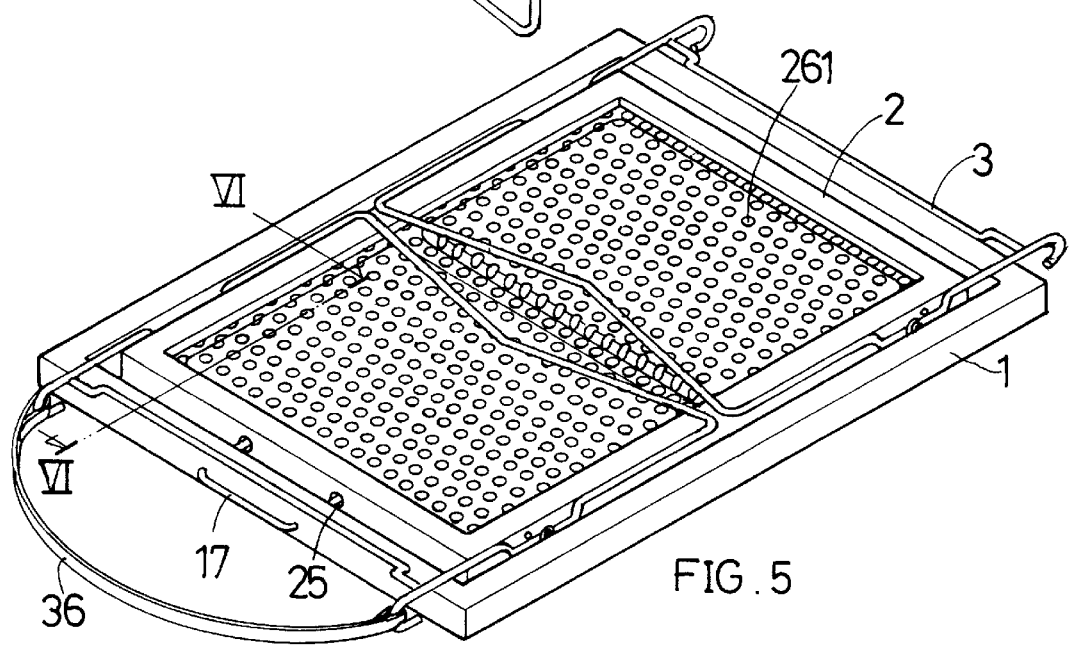
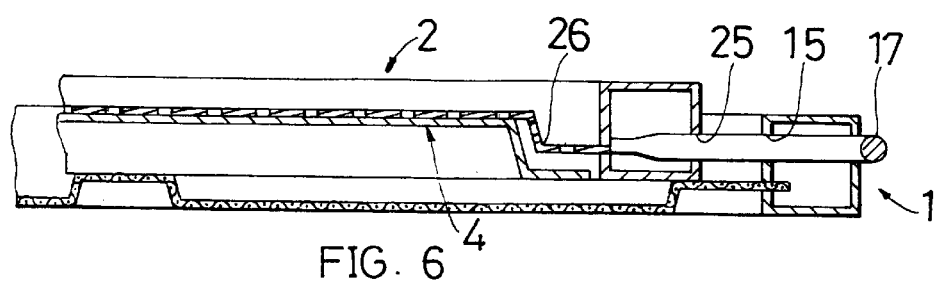

BARBECUE RACK

BACKGROUND OF THE INVENTION

The present invention is related to a barbecue rack in which the barbecue grill, the base seat and the barbecue tray can be stacked into one single unit.

FIG. 8 shows an existent barbecue rack including a main body 9, a base seat 91, multiple support legs 92, grill supports 93 and barbecue grills 94. The bottom of the main body 9 is formed with multiple vents 95 and slide rails 96. The base seat 91 is inserted into the slide rails 96 and the support legs 92 are inserted into the base of the base seat 91. The grill supports 93 and the barbecue grill 94 are engaged with the edges of the base seat 91.

The above barbecue rack has the following shortcomings:

1. Even if the components of such barbecue rack are disassembled and stacked, much room is still occupied as shown in FIG. 9.

2. Such barbecue rack includes multiple components which must be inserted with each other. Therefore, it is troublesome and time-consuming to assemble these components of such barbecue rack. Especially, the sharp edges of the base seat 91 and the main body 9 tend to cut a user when assembled. Moreover, the components of such barbecue rack is likely to miss.

3. In use of the existent barbecue rack, due to the limitation of height of the grill support 93 and the way by which the barbecue grill 94 is fixed, the grill support 93 and the barbecue grill 94 tend to detach and drop. During barbecue, the grill support 93 has been heated and thus it will be difficult to again engage the grill support 93 into the base seat 91. Moreover, the barbecue grill 94 is fixed with the grill support 93 on one single side so that the barbecue grill 94 is easy to incline and deform. This will lead to dropping of the foods. In addition, the distance between the barbecue grill 94 and the carbon is fixed and cannot be adjusted in accordance with actual need. Therefore, the use of such barbecue rack is convenient.

SUMMARY OF THE INVENTION

It is therefore a primary object of the present invention to provide a barbecue rack including a barbecue grill, a base seat, two support legs and a barbecue tray. The frame of each of the barbecue grill and the base seat has a longitudinal section, whereby the barbecue grill, base seat and the barbecue tray can be stacked into one single unit as a thin rectangular body. Therefore, the storage room is saved and the barbecue rack can be easily quickly assembled. The components of the barbecue rack can be firmly associated and the barbecue grill is not easy to detach and drop. The height of the barbecue grill can be stagelessly adjusted by means of the support legs of the base seat as necessary.

The present invention can be best understood through the following description and accompanying drawings wherein:

BRIEF DESCRIPTION OF THE DRAWINGS

FIG. 4 is a perspective view showing the use of the present invention in still another state;

FIG. 5 is a perspective view of the present invention in a stacked state;

FIG. 6 is a sectional view taken along line VI—VI of FIG. 5;

DETAILED DESCRIPTION OF THE PREFERRED EMBODIMENT

Figure 1:
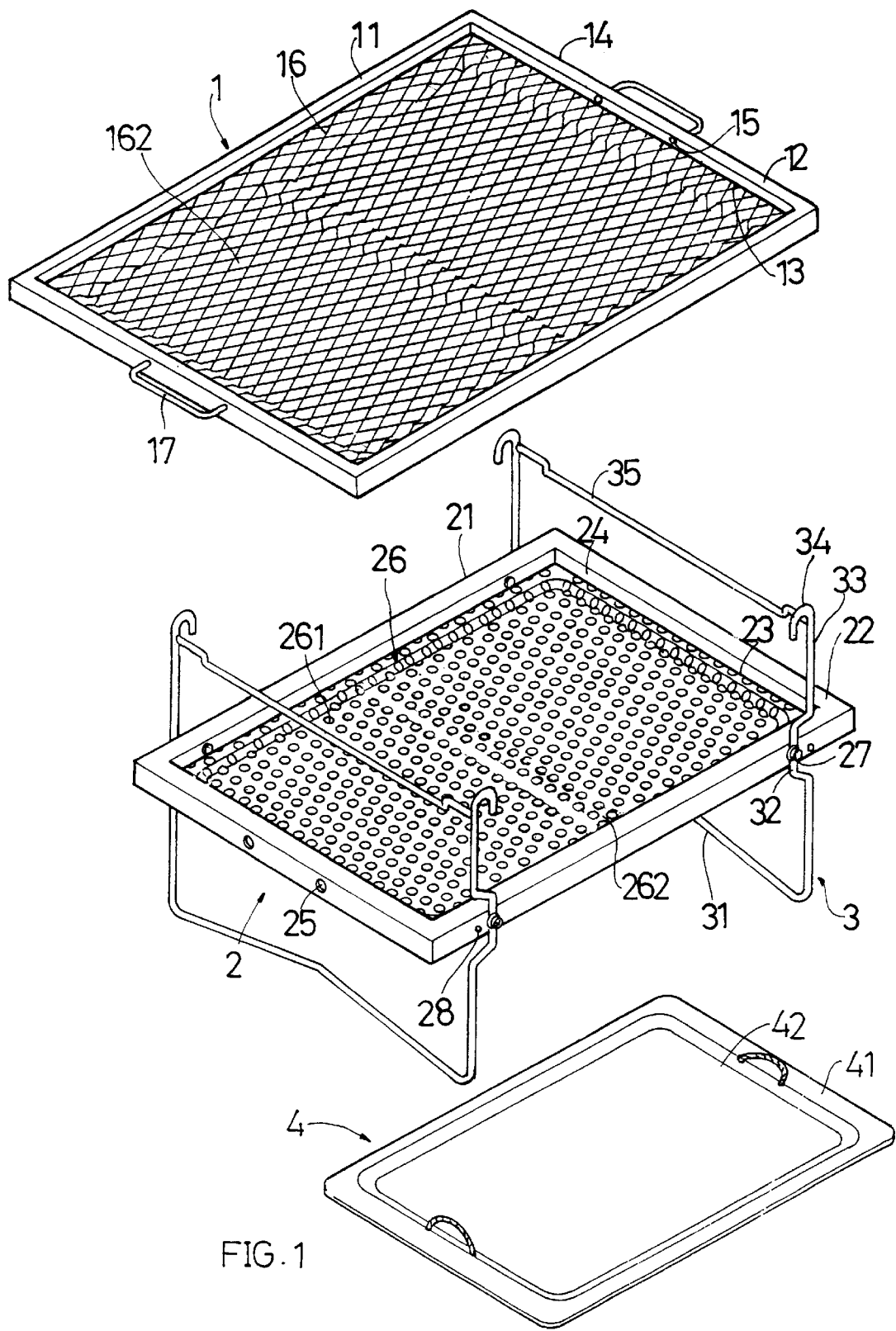
FIG. 1 is a perspective exploded view of the present invention.

Please refer to FIGS. 1 to 7. The present invention includes:

a barbecue grill 1 and a base seat 2 each of which has two long tubes 11, 21 and two short tubes 12, 22 welded with each other to form a frame, the long and short tubes 11, 21, 12, 22 being rectangular stainless steel tube, the opposite inner sides of the long and short tubes 11, 21, 12, 22 being respectively formed with slits 13, 23 axially extending to two ends thereof, the long and short tubes 11, 21, 12, 22 being respectively formed with longitudinal sections 14, 24 on the top and bottom sides of the slits 13, 23, the longitudinal sections 14, 24 having a predetermined height, grill bodies 16, 26 being inserted in the slits 13, 23 of the long and short tubes 11, 21, 12, 22, the longitudinal sections 14, 24 clamping the grill bodies 16, 26, the barbecue grill 1, base seat 2 and the grill bodies 16, 26 being fixedly welded with each other at any position, the profile of the base seat 2 being slightly smaller than that of the barbecue grill 1 for placing the base seat 2 in the barbecue grill 1, the grill bodies 16, 26 respectively having more than one recessed sect ions 162, 262 in which the carbons and foods are respectively placed without dropping out, in this embodiment, the grill body 16 of the barbecue grill 1 being made of metal wires crossing each other, the grill body 26 of the base seat 2 being made of a metal sheet punched with multiple circular holes 261, a middle section of each short tube 12 of the barbecue grill 1 being formed with two through holes 15 in which a handle 17 is fitted, each of the two long tubes 21 of the base seat 2 being formed with two pivot sections 27 opposite to the pivot sections of the other, a middle section of each of the short tubes 22 of the base seat 2 being formed with two holes 25;

two support legs 3 made of stainless steel wire by bending, a middle section of each of the support legs 2 being formed with a supporting section 31, two ends of the supporting section 31 being inward bent to form pivot sections 32 pivotally connected with the pivot sections 27 of the base seat 2, the other side of the pivot section 32 being further outward bent to form a top section 33, a free end of the top section 33 being bent to form a hook section 34, the two top sections 33 of the support legs 3 being interconnected by a connecting section 35, in addition, one side of the base seat 2 with the support leg 3 being disposed with a stop projection 28 for restricting the rotation position of the support leg 3; and a barbecue tray 4 which is substantially rectangular, the periphery of the barbecue tray 4 being formed with an upward extending tray edge 41 which has a height difference from the bottom 42 of the barbecue tray 4, the profile of the barbecue tray 4 being slightly smaller than the base seat 2 for placing into the base seat 2, the two support legs 3 being bent to be substantially parallel to the base seat 2. As shown in FIGS. 5 and 6, The base seat 2 and the barbecue tray 4 are turned upside down and placed into the barbecue grill 1. The barbecue tray 4 is placed between the base seat 2 and the barbecue grill 1. The barbecue grill 1 and the base seat 2 are formed with longitudinal sections 14, 24 so that the base seat 1 will not protrude beyond the barbecue grill 1 by an excessive height. The top section 33 of the support leg 3 abuts against the top face of the barbecue grill 1. The handles 17 on two sides of the barbecue grill 2 can be inserted into the holes 25 of the base seat 2. Therefore, the barbecue grill 1, base seat 2 and the barbecue tray 4 can be assembled into one unit.

Figure 2:
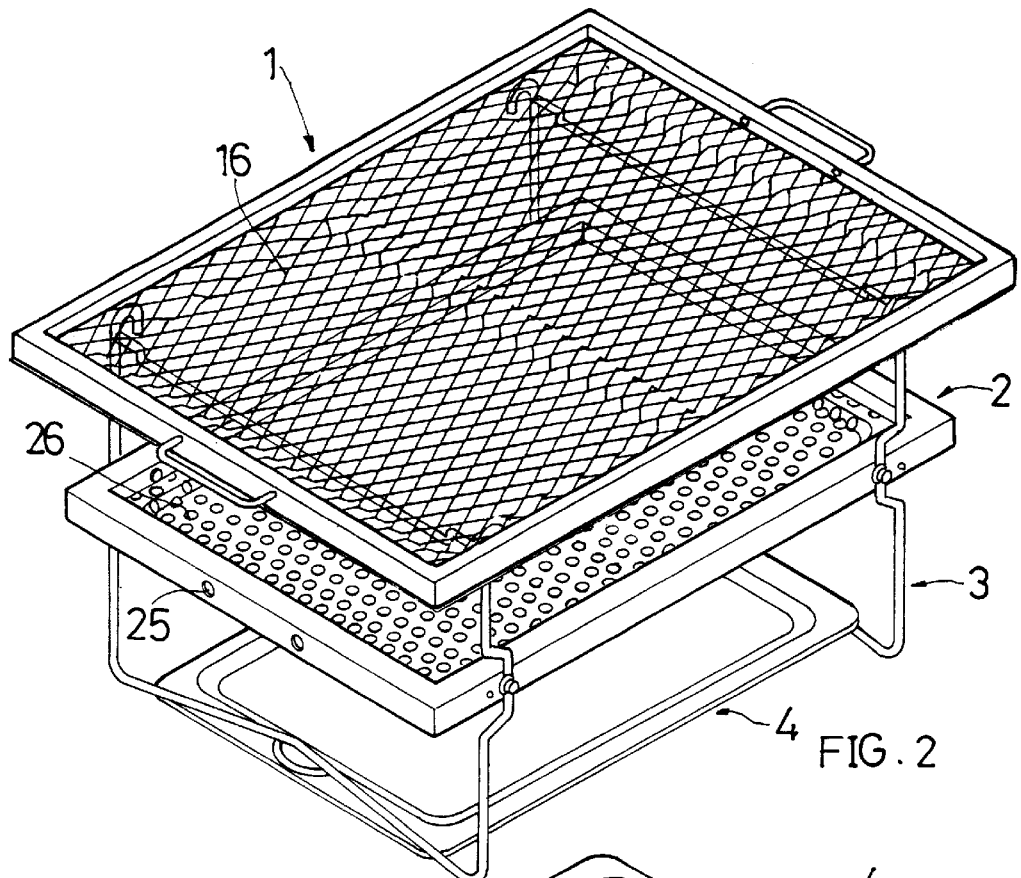
FIG. 2 is a perspective view showing the use of the present invention in one state.

In use, as shown in FIG. 2, the support legs 3 are pivotally rotated to make the supporting sections 31 thereof contact with the ground. Then the barbecue grill 1 is placed on the hook sections 34 of the support legs 3. By means of the longitudinal sections 14 of the barbecue grill 1, the barbecue grill 1 is located on the support legs 3. In addition, the longitudinal sections 14, 24 serve to reinforce the grill bodies 16, 26 so that the barbecue grill 1 and the base seat 2 are not easy to bend. Therefore, the foods can be placed on the entire grill body 16 of the barbecue grill 1 and stopped from rolling down. Therefore, the entire area of the grill body 26 can be used. In addition, the barbecue tray 4 is placed under the base seat 1 for containing the ash of the carbon.

Figure 3:
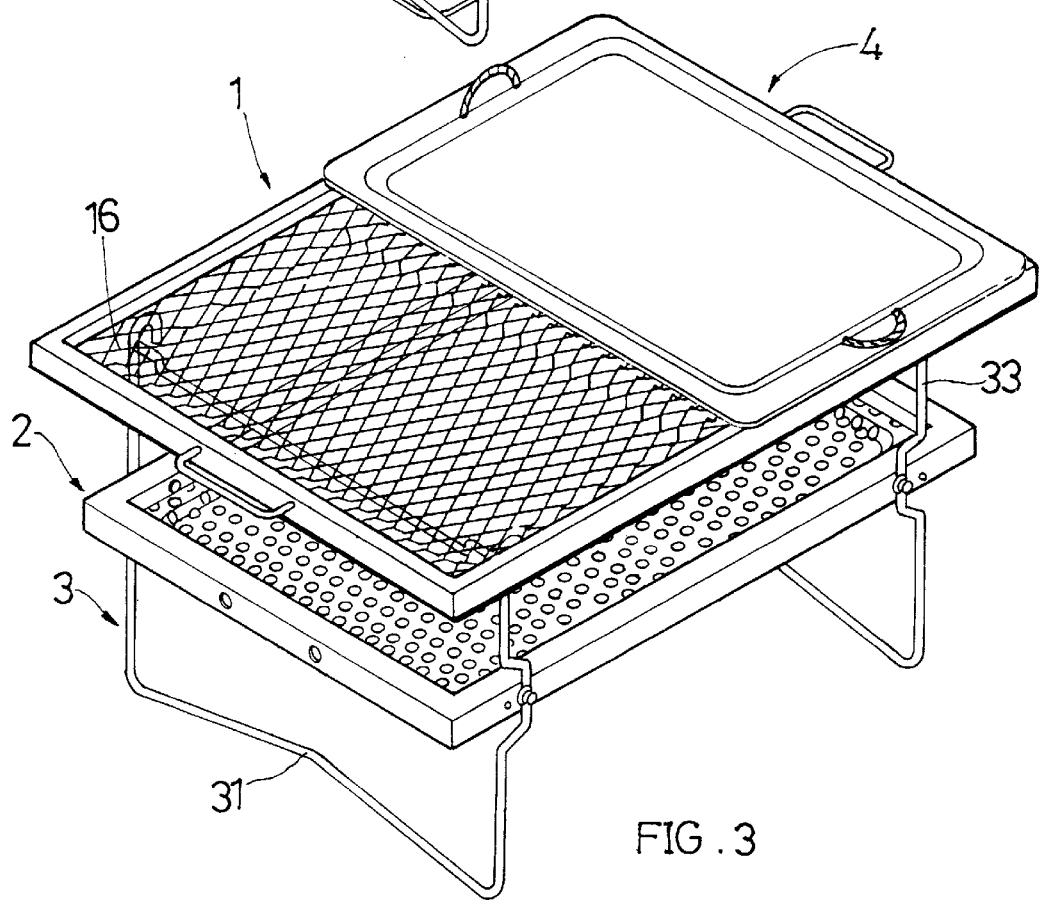
FIG. 3 is a perspective view showing the use of the present invention in another state.

As shown in FIG. 3, the barbecue tray 4 can be also placed on the barbecue grill 1 for grilling fishes, clams or other foods with fluid. Alternatively, as shown in FIG. 4, only the barbecue tray 4 is placed on the connecting sections 35 of the support legs 3 without using the barbecue grill 1. Under such circumstance, the foods can be still grilled.

Figure 7:
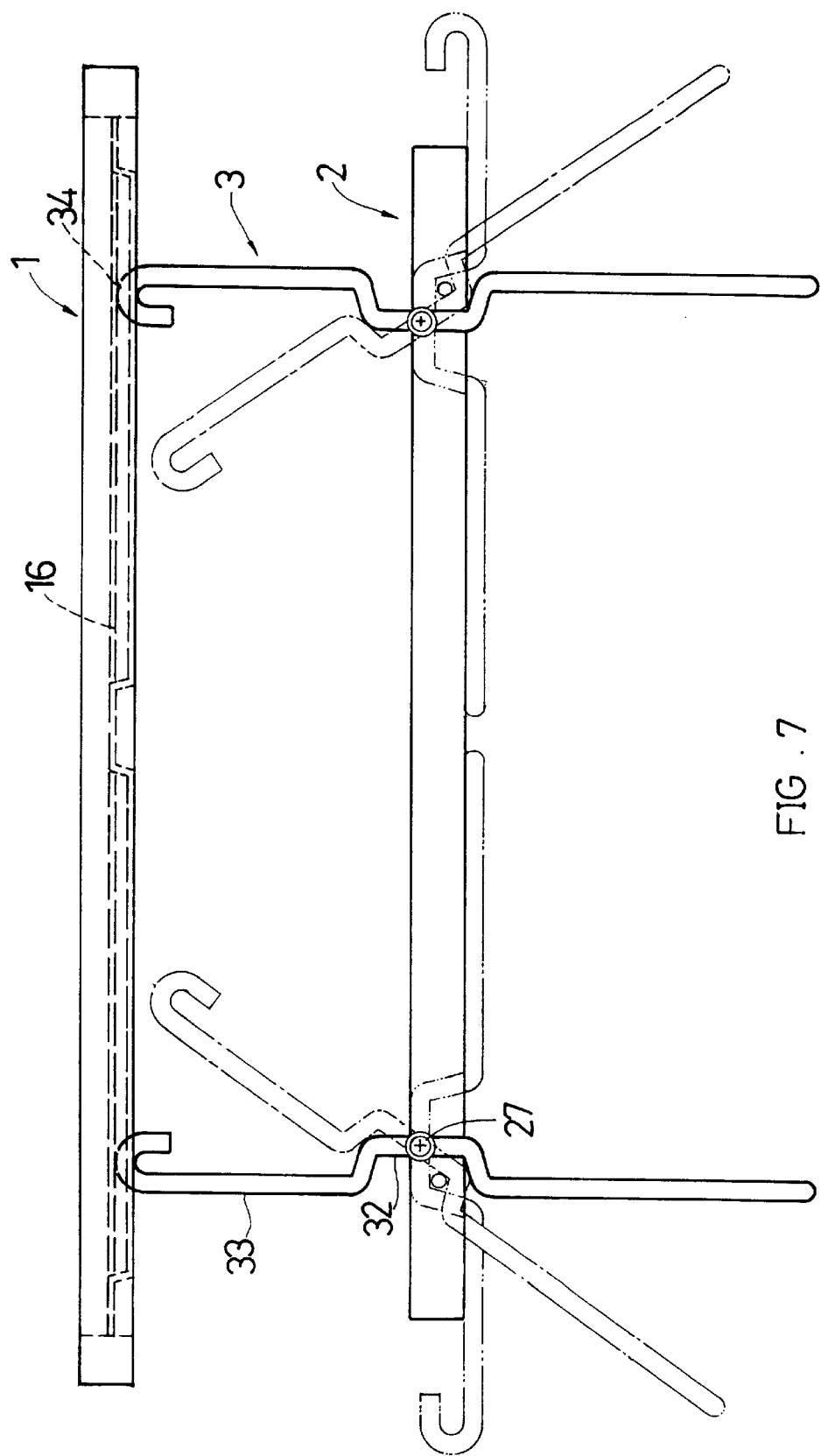
FIG. 7 shows that the height of the barbecue grill of the present invention is adjusted.
Figure 8:
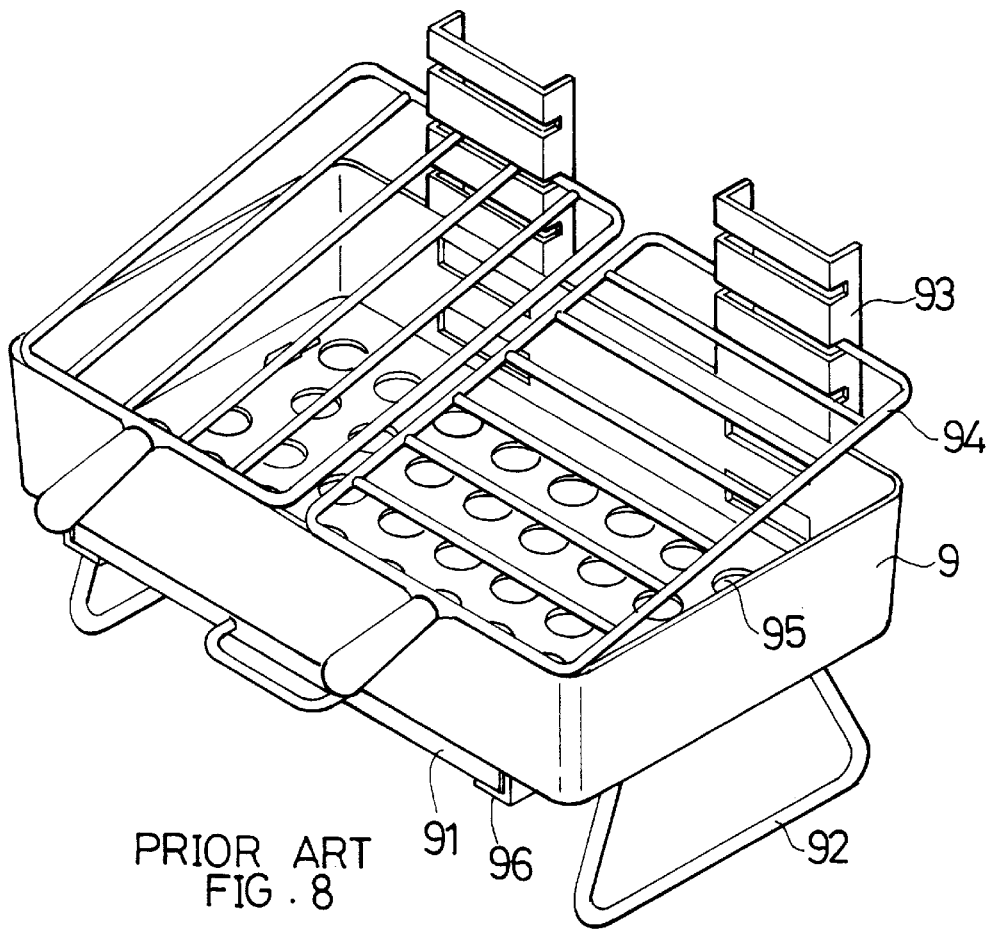
FIG. 8 is a perspective view of a conventional barbecue rack.
Figure 9:
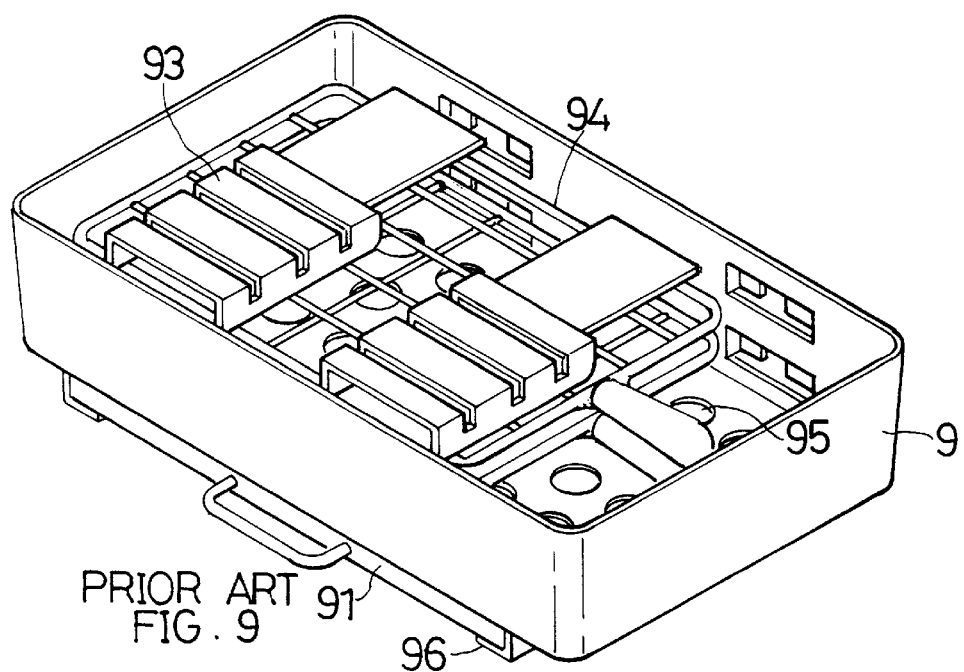
FIG. 9 is a perspective view of the conventional barbecue rack in a collected state.

The present invention can be used only by means of pivotally rotating the support legs 3. In addition, the present invention is not assembled by way of insertion. The barbecue grill 1, base seat 2 and the barbecue tray 4 can be stacked into one single unit as a thin rectangular body. A belt 36 can be passed through the hook sections 34 of the support legs 3 for easy carriage of the entire unit. The height of the barbecue grill 1 can be adjusted by means of the support legs 3 of the base seat 2. Therefore, a user can stagelessly adjust the distance between the barbecue grill 1 and the carbons as necessary. As shown in FIG. 7, in the case of more carbons, the support legs 3 can be adjusted to an upright state to enlarge the distance between the barbecue grill 1 and the base seat 2. Therefore, the present invention can save storage room and can be easily quickly assembled. The barbecue rack is stably supported by the support legs 3 and the barbecue grill 1 is not easy to detach and drop.

The above embodiment is only used to illustrate the present invention, not intended to limit the scope thereof. Many modifications of the above embodiment can be made without departing from the spirit of the present invention.

What is claimed is:

1. A barbecue rack comprising:

a barbecue grill and a base seat each of which has a frame and a grill body, the frame having a longitudinal section with a predetermined height, the profile of the base seat being slightly smaller than that of the barbecue grill for placing the base seat into the barbecue grill, the barbecue grill being formed with multiple through holes, multiple handles being fitted in the through holes, more than two pivot sections being disposed on the base seat opposite to each other;

two support legs a middle section of each of the support legs being formed with a supporting section, two ends of the supporting section being inward bent to form pivot sections pivotally connected with the pivot sections of the base seat, the other side of the pivot section being formed with a top section;

a barbecue tray a periphery of which is formed with an upward extending tray edge, the profile of the barbecue tray being slightly smaller than the base seat for placing into the base, seat, the supporting sections of the support legs serving to stop the barbecue grill and barbecue tray.

2. A barbecue rack as claimed in claim 1, wherein the frame of the barbecue grill and the base seat is composed of two long tubes and two short tubes which are connected with each other, the opposite inner sides of the long and short tubes being respectively formed with slits axially extending to two ends thereof, the grill bodies being inserted into the slits.

3. A barbecue rack as claimed in claim 1, wherein the long and short tubes are rectangular stainless steel tubes.

4. A barbecue rack as claimed in claim 1, wherein the base seat is formed with multiple holes corresponding to the through holes of the barbecue grill, the handles of the barbecue grill being inserted into the holes.

5. A barbecue rack as claimed in claim 1, wherein the support legs are made of stainless steel wire by bending, the pivot sections being bent toward one side of the supporting section, the other side of the pivot section being further outward bent to form the top section.

6. A barbecue rack as claimed in claim 1, wherein top section is bent to one side to form a hook section, the top sections being interconnected by a connecting section.

7. A barbecue rack as claimed in claim 1, wherein one side of the base seat with the support leg is disposed with a stop projection for restricting the rotation position of the support leg.

* * * * *